United States Patent [19]

Senso

[11] Patent Number: 5,159,460
[45] Date of Patent: Oct. 27, 1992

[54] VIDEO SIGNAL RECORDING APPARATUS THAT CONVERTS HIGH DEFINITION VIDEO SIGNALS INTO SIGNALS USABLE WITH CONVENTIONAL TELEVISION SYSTEMS

[75] Inventor: Hitoshi Senso, Tokyo, Japan

[73] Assignee: Pioneer Electronic Corporation, Tokyo, Japan

[21] Appl. No.: 498,058

[22] Filed: Mar. 23, 1990

[30] Foreign Application Priority Data

Aug. 30, 1989 [JP] Japan .................................. 1-221708
Aug. 30, 1989 [JP] Japan .................................. 1-221709

[51] Int. Cl.$^5$ ............................................. H04N 5/76
[52] U.S. Cl. ................................... 358/310; 358/335; 358/87; 358/93; 358/108
[58] Field of Search ................... 358/93, 87, 108, 310, 358/335, 342; 360/9.1, 8, 22, 35, 32

[56] References Cited

U.S. PATENT DOCUMENTS

| | | | |
|---|---|---|---|
| 3,794,758 | 2/1974 | Dudley | 358/93 X |
| 4,485,409 | 11/1984 | Schumacher | 358/93 X |
| 4,660,096 | 4/1987 | Arlan et al. | 358/310 |
| 4,939,586 | 7/1990 | Nabati et al. | 358/342 |

Primary Examiner—Robert L. Richardson
Attorney, Agent, or Firm—Sughrue, Mion, Zinn, Macpeak & Seas

[57] ABSTRACT

A video signal recording method and apparatus in which a video signal for a high definition television system is converted into a video signal for a current television system and recorded on record media. These video signals are recorded so as not to cause a deterioration in picture image quality such as color phase irregularity. According to the present video signal recording method, a screen to be displayed in a high definition television system is divided into a plurality of screens, video signals of each of which are then converted into signals of a current television system. A luminance signal and a chrominance signal of each of the signals of the current television system are time division multiplexed. Signals obtained from the time division multiplexing are recorded onto a plurality of record media with or without a color burst signal added thereto for each line.

18 Claims, 5 Drawing Sheets

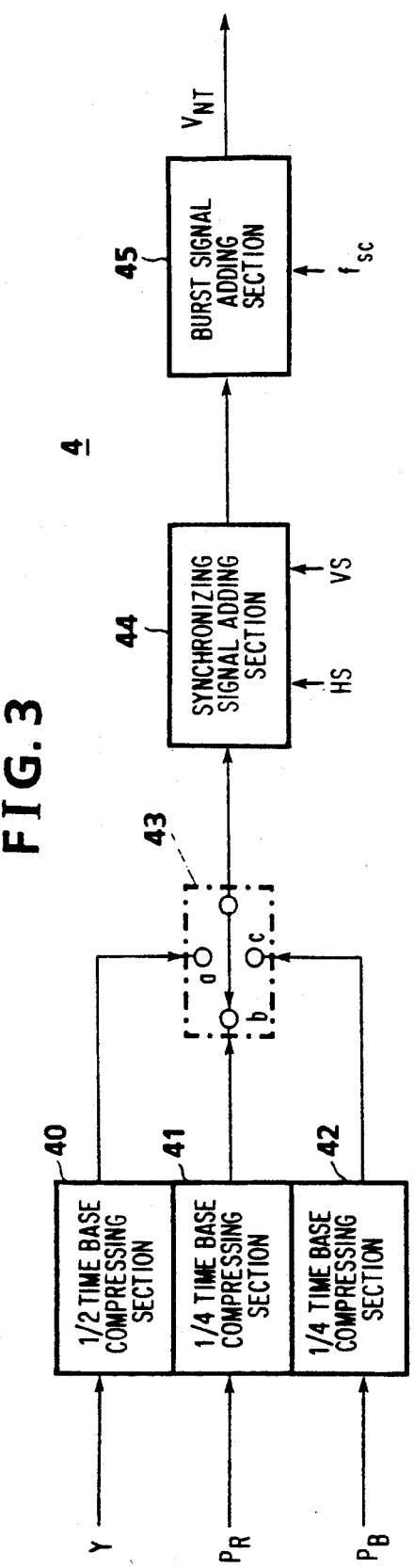
FIG. 3
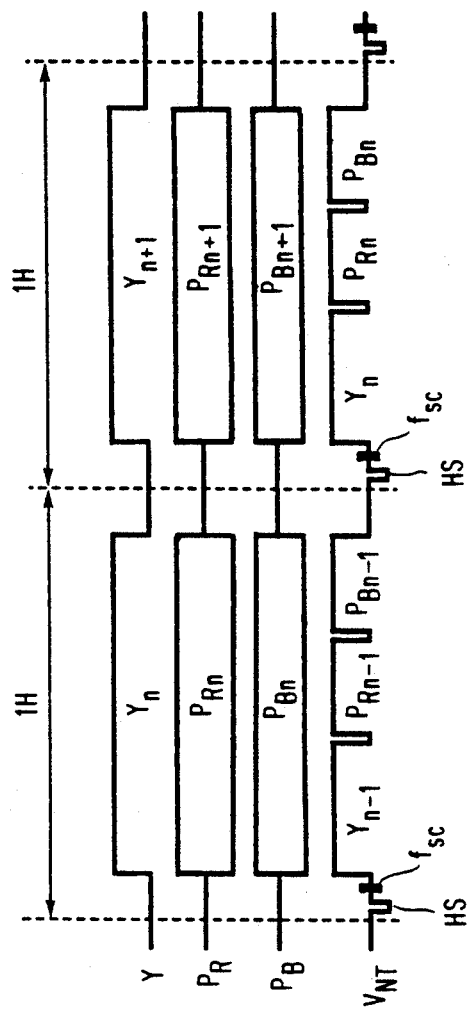
FIG. 4a
FIG. 4b
FIG. 4c
FIG. 4d

VIDEO SIGNAL RECORDING APPARATUS THAT CONVERTS HIGH DEFINITION VIDEO SIGNALS INTO SIGNALS USABLE WITH CONVENTIONAL TELEVISION SYSTEMS

BACKGROUND OF THE INVENTION

1. Field of the Invention

This invention relates to a video signal recording method wherein a screen to be displayed in accordance with a high definition television system is divided into a plurality of screens and video signals of such divisional screens are individually converted into video signals according to a current television system and recorded on a plurality of record media.

2. Description of the Prior Art

As a novel television system which may replace a current television system, high definition television systems such as for example, a high vision system, have been proposed which can achieve not only improvement in quality of a screen and quality of sound but also high visual psychological effects such as an ambience feeling or an impressive feeling which are far above those of a current television system.

Since the high vision system is very different in screen system, scanning system and voice system from those of a current television system, for example, the NTSC system, it is impossible to reproduce a high vision signal as it is using an image receiving apparatus or television set of the NTSC system. Thus, a high vision to NTSC converter (down converter) has been proposed wherein a high vision signal is converted into an NTSC signal absorbing differences in effective scanning line number, aspect ratio, horizontal scanning frequency and so forth between the two systems.

FIGS. 8a and 8b illustrate examples of an output image of a down converter. In particular, referring first to FIG. 8a, there is shown a mode wherein 1,035 effective scanning lines of the high vision are reduced to about one half and allotted to 483 effective scanning lines of the NTSC system and picture elements of 10% on each of left and right sides of an image are deleted to obtain an NTSC image without changing the aspect ratio of 4:3 of the NTSC system. Such left and right portions to be deleted, however, can be selected arbitrarily. On the other hand, FIG. 8b shows another mode wherein 1,035 effective scanning lines of the high vision are reduced to about one third and allotted to 362 effective scanning lines of the NTSC system to obtain an image of the NTSC system without changing the aspect ratio of 16:9 of the high vision, and while 10% of a screen at each of upper and lower portions makes a marginal area, the composition of a screen coincides with that of a screen of the high vision.

In a system which employs such a down converter as described above, however, since the number of scanning lines of the high vision is reduced to convert a high vision signal into an NTSC signal, reproduction of an image of a high picture image quality cannot be anticipated, and particularly in a mode wherein left and right portions of an image are deleted, an image of a composition intended with the high vision cannot be obtained.

Therefore, the present applicant has proposed a video signal recording method (Japanese Patent Application No. 1-43171) as a method by means of which an image of a high picture image quality based on the high vision can be displayed on an NTSC image receiving apparatus while maintaining such high quality.

According to the method, a screen of the high vision is divided into a plurality of screens, and high vision signals of the thus divided screens are individually converted into NTSC signals and recorded on record media. Next, the recorded record media are reproduced simultaneously to reproduce the image of a high picture image quality on an NTSC image receiving apparatus. With this method, a high definition image can be displayed on a large screen in sufficient luminance.

Referring now to FIGS. 9a, 9b and 9c, there is shown construction of a screen illustrating a principle of the method. A screen of the high vision is specified such that the aspect ratio is 16:9 and the number of scanning lines in one frame is 1,125 among which the number of scanning lines of an effective screen is 1,035 (FIG. 9a). On the other hand, a screen of the NTSC system is specified such that the aspect ratio is 4:3 and the number of scanning lines in one frame is 525 among which the number of scanning lines of an effective screen is 483 (FIG. 9b).

A screen of the high vision is thus divided into three sections in a vertical direction and divided into four sections in a horizontal direction so that it is divided totally into 12 screens. High vision signals of the screens #1 to #12 obtained by such division are individually converted into NTSC signals and recorded on 12 video disks. Then, if the 12 video disks are reproduced simultaneously with 12 NTSC image receiving apparatus, and the aspect ratio of each of the divisional screens is 4:3, the aspect ratio of the entire screen is 16:9 which coincides with the aspect ratio of the high vision (FIG. 9c). In this instance, if a projection unit for the multi-display is used as an NTSC image receiving apparatus, a high vision display having a sufficiently high brightness for the practical use can be obtained on the NTSC image receiving apparatus while maintaining the high definition on a large screen.

With this method, however, since a video signal is recorded in the form of a composite signal, color phase irregularity appears in a reproduced image due to time base fluctuations of video disks, which deteriorates the quality of a picture image and is not preferable.

SUMMARY OF THE INVENTION

It is an object of the present invention to provide a video signal recording method by means of which, when a video signal based on a high definition television system is to be converted into a video signal based on a current television system and recorded on record media, such video signals can be recorded so as not to cause a deterioration in picture image quality such as color phase irregularity.

It is another object of the present invention to provide a video signal recording method which permits a video signal recorded in accordance therewith to be reproduced on a reproducing apparatus based on a current television system.

In order to attain the objects, according to an aspect of the present invention, there is provided a video signal recording method which comprises the steps of dividing a screen to be displayed in accordance with signals of a high definition television system into a plurality of screens, converting video signals of each of the screens thus obtained into signals of a current television system, time division multiplexing a luminance signal and chrominance signals of each of the signals of the current television system, and recording signals obtained by such time division multiplexing onto a plurality of record media.

According to another aspect of the present invention, there is provided a video signal recording method which comprises the steps of dividing a screen to be displayed in accordance with signals of a high definition television system into a plurality of screens, converting video signals of each of the screens thus obtained into signals of a current television system, time division multiplexing a luminance signal and chrominance signals of each of the signals of the current television system, adding a color burst signal for each line to signals obtained by such time division multiplexing, and recording signals obtained by such addition onto a plurality of record media.

In such time division multiplexing, two chrominance signals and a luminance signals which constitute each of signals of the current television system may be time division multiplexed after the luminance signal is time base compressed to one half and each of the two chrominance signals is time base compressed to one forth. Or alternatively, one of two line sequentially arrayed chrominance signals and a luminance signal which constitute each of signals of the current television system may be time division multiplexed after the luminance signal is time base compressed to two thirds and the one chrominance signal is time base compressed to one third.

Upon reproduction, the plurality of record media are reproduced simultaneously by means of a corresponding number of reproducing units, and luminance signals and chrominance signals in a time base compressed condition obtained by such simultaneous reproduction are decoded to allow divisional screens to be displayed as an integrated screen on display units.

With either of the video signal recording methods according to the present invention, since a luminance signal and a chrominance signal or signals are recorded in a time division multiplexed condition for each line, occurrence of color phase irregularity which may possibly be caused by time base variation of a record medium or media can be restricted, and consequently, video signals which are not deteriorated in quality of a picture image can be obtained.

In addition, with the latter video signal recording method according to the present invention, video signals can be reproduced using reproducing apparatus based on a current television system without using a special reproducing apparatus.

The above and other objects, features and advantages of the present invention will become apparent from the following description and the appended claims, taken in conjunction with the accompanying drawings in which like parts are denoted by like reference characters all through the drawings.

BRIEF DESCRIPTION OF THE DRAWINGS

FIG. 3 is a block diagram showing construction of a TCI encoder of the video signal recording apparatus of FIG. 1;

FIG. 4 is a timing chart illustrating operation of the TCI encoder of FIG. 3;

DESCRIPTION OF THE PREFERRED EMBODIMENT

Figure 1:
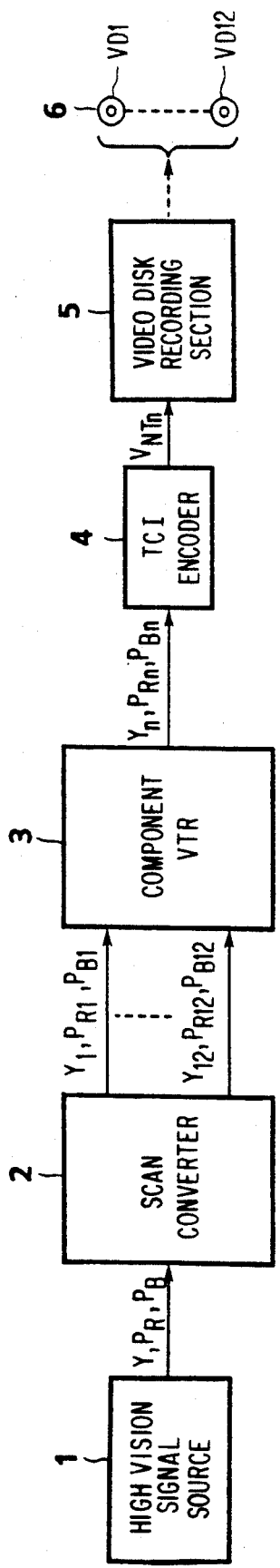
FIG. 1 is a block diagram of a video signal recording apparatus which employs a video signal recording method according to the present invention.

Referring first to FIG. 1, there is shown a video signal recording apparatus which employs a video signal recording method according to the present invention. In the following description, the high vision system and the NTSC system are taken as examples of a high definition television system and a current television system, respectively.

The video signal recording apparatus shown in FIG. 1 includes a high vision signal source 1 which matrix converts each of RGB signals received, for example, from a high vision camera not shown into a luminance signal Y and color-difference signals R-Y and B-Y and outputs them as a luminance signal Y and color-difference signals $P_R$ and $P_B$, respectively. The color-difference signals R-Y and B-Y and the color-difference signals $P_R$ and $P_B$ have the following relationship:

$$P_R = (R-Y)/1.576$$

$$P_B = (B-Y)/1.826$$

The high vision signal source 1 may otherwise be equipment which converts a image of a film into a high vision signal, or a MUSE decoder which receives a MUSE signal transmitted from a broadcasting satellite, or else a high vision video tape recorder or the like.

A scan converter 2 divides a video signal representative of a screen for a high vision system into a plurality of video signals, converts the video signals into video signals of the NTSC system, and outputs the video signals. Where a screen is divided, for example, into three sections in a vertical direction and into four sections in a horizontal direction and consequently is divided into a total of 12 screens, a high vision luminance signal Y is divided into 12 luminance signals $Y_1$ to $Y_{12}$ and each of color-difference signals $P_R$ and $P_B$ are divided into 12 color-difference signals $P_{R1}$ to $P_{R12}$ or $P_{B1}$ to $P_{B12}$. Then, the 12 sets of video signals are recorded by a component video tape recorder (VTR) 3.

Figure 2:
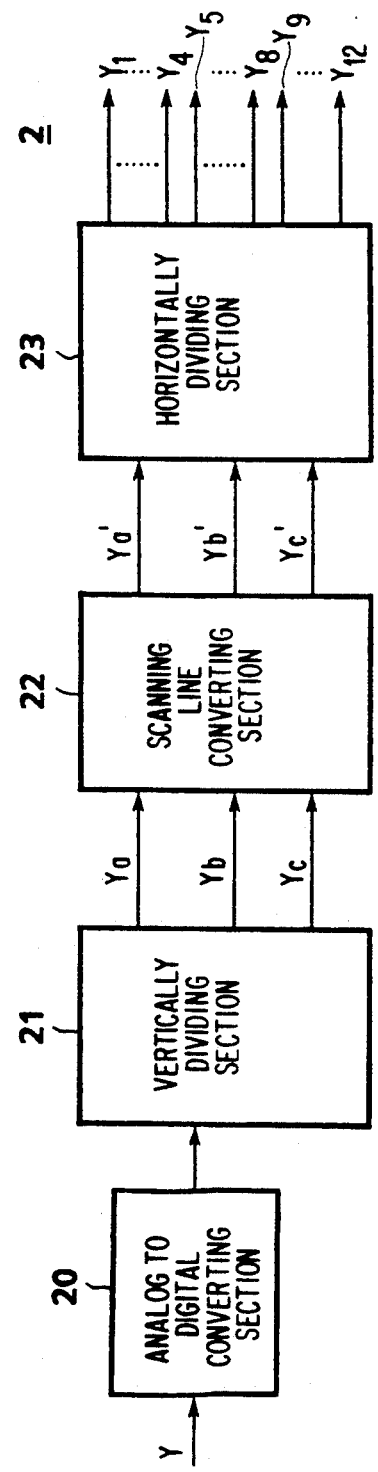
FIG. 2 is a block diagram showing construction of a scan converter of the video signal recording apparatus of FIG. 1.

Referring now to FIG. 2, construction of the scan converter 2 and processing of a luminance signal Y by the same are exemplarily shown. The scan converter 2 shown includes an analog to digital converting section 20 which receives a high vision luminance signal Y from the high vision signal source 1, converts the received luminance signal Y into 8-bit digital data of 8 bits and delivers the obtained digital data to a vertically dividing section 21. The vertically dividing section 21 divides horizontal scanning line data of the high vision signal in a vertical direction into three sets for each field and stores them in first to third field memories. Thus, the horizontal scanning line data of the first set are stored in the first field memory, the horizontal scanning line data of the second set are stored in the second field memory and the horizontal scanning line data of the third or last set are stored in the third field memory. The three sets of horizontal scanning line data are individually read from the field memory in response to a clock signal of a predetermined frequency and are delivered as scanning line data Ya, Yb and Yc to a scanning line converting section 22.

The scanning line converting section 22 converts the horizontal scanning line data Ya, Yb and Yc received from the vertically dividing section 21 by 5:7 and outputs them as scanning line data Ya', Yb' and Yc', respectively. The scanning line converting section 22 is constituted, for example, by a vertical filter consisting of a 1 H delay element with 7 taps.

A horizontally dividing section 23 receives the scanning line data Ya' to Yc' from the scanning line converting section 22 and divides each of the scanning line data Ya' to Yc' horizontally into four data. In particular, the horizontally dividing section 23 divides the scanning line data Ya' into scanning line date $Y_1$ to $Y_4$, the scanning line data Yb' into scanning line data $Y_5$ to $Y_8$ and the scanning line data Yc' into scanning line data $Y_9$ to $Y_{12}$. The horizontally dividing section 23 delivers the scanning line data $Y_1$ to $Y_{12}$ thus obtained as an output of the scan converter 2.

Referring back to FIG. 1, though not shown, the scan converter 2 includes similar converting means which similarly divides color-difference signals $P_R$ and $P_B$ received from the high vision signal source 1 into color-difference signals $P_{R1}$ to $P_{R12}$ and $P_{B1}$ to $P_{B12}$, respectively, which are also outputted from the scan converter 2.

A TCI encoder 4 receives these three sets ($Y_1$-$Y_{12}$, $P_{R1}$-$P_{R12}$ and $P_{B1}$-$P_{B12}$) of 12 video signals from the component VTR 3, time division multiplexes the received video signals for each set, and adds a color burst signal to the thus obtained signals for each line. Construction of the TCI encoder 4 is shown in FIG. 3.

Referring to FIG. 3, the TCI encoder 4 includes a one half time base compressing section 40 for time base compressing a luminance signal Y to one half, a pair of one fourth time base compressing sections 41 and 42 for time base compressing color-difference signals $P_R$ and $P_B$ to one fourth, respectively. A change-over circuit 43 successively changes between outputs of the time base compressing sections 40 to 42 to time base multiplex them. A synchronizing signal adding section 44 adds horizontal and vertical synchronizing signals HS and VS of the NTSC system to a time base multiplexed signal received from the change-over circuit 43. A burst signal adding section 45 adds a color burst signal $f_{SC}$ of the NTSC system and outputs it as a video signal $V_{NT}$ of the NTSC system. The TCI encoder 4 thus successively outputs video signals $V_{NT1}$ to $V_{NT12}$.

Referring back to FIG. 1, a video disk recording section 5 receives such video signals $V_{NT1}$ to $V_{NT12}$ from the TCI encoder 4 and records them on corresponding disks of a video disk set 6 which includes up to 12 video disks $VD_1$ to $VD_{12}$. The 12 video disks $VD_1$ to $VD_{12}$ correspond to the 12 screens #1 to #12 described hereinabove.

With the construction, high vision signals Y, PR and PB outputted from the high vision source 1 and received by the scan converter 2 are converted into digital data by the analog to digital converting section 20. This, in the present example 1125 scanning lines data obtained by such conversion are divided in a vertical direction into three sets of data (each having data for 375 scanning lines) by the vertically dividing section 21. Then, the scanning line data for each 375 scanning lines is converted by 5:7 into scanning line data for 525 scanning lines. This converted data is further divided in a horizontal direction into four sets of data by the horizontally dividing section 23 so that they are outputted as 12 sets of video signals (luminance signals $Y_1$ to $Y_{12}$ and color-difference signals $P_{R1}$ to $P_{R12}$ and $P_{B1}$ to $P_{B12}$). A total of 12 sets of video signals which consist of three sets in a vertical direction and four sets in a horizontal direction for each field in this manner are recorded by the VTR 3 and then recorded on the video disks $VD_1$ to $VD_{12}$ of the video disk set 6.

The 12 sets of video signals recorded by the VTR 3 are successively supplied for each set to the TCI encoder 4, in which the luminance signals Y and the two color-difference signals $P_R$ and $P_B$ are time base compressed to one half and one fourth, respectively, as shown in FIG. 4. Then they are time division multiplexed for each line (H) by the change-over circuit 43. Then, horizontal and vertical synchronizing signals HS and VS of the NTSC system are added by the synchronizing signal adding section 44. Next a color burst signal $f_{SC}$ is added by the burst signal adding section 45 so that the signal is recorded as a video signal $V_{NTn}$ (n = 1 to 12) of the NTSC system on corresponding video disks in the video disk set 6.

Figure 5:
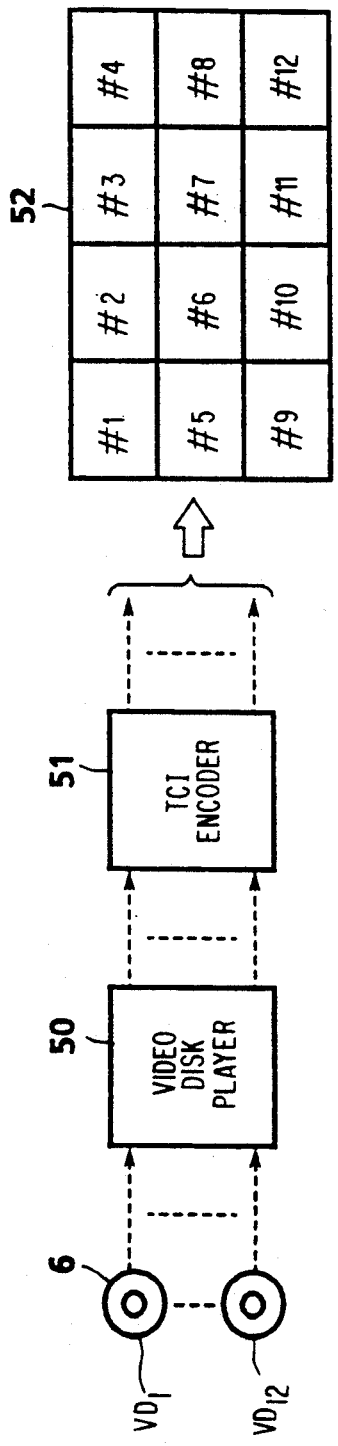
FIG. 5 is a block diagram showing a reproducing apparatus for a video signal recorded in accordance with the present invention.

The 12 sets of video signals recorded on the 12 video disks $VD_1$ to $VD_{12}$ are reproduced by such a reproducing apparatus as shown in FIG. 5. Referring to FIG. 5, the reproducing apparatus shown includes a video disk player 50 of the NTSC system for reading video signals recorded on the video disks $VD_1$ to $VD_{12}$, a TCI decoder 51 for expanding a luminance signal and a color-difference signal read by the player 50, and a multi-display unit 52 for constituting 12 screens #1 to #12.

In the reproducing apparatus, luminance signals and two kinds of color-difference signals recorded on the video disks $VD_1$ to $VD_{12}$ are read by the video disk player 50, and then a luminance signal and two color-difference signals of each set in a time division multiplexed condition are separated from each other, expanded and demodulated into an RGB signal by the TCI encoder 51. Then, such RGB signals are supplied to and displayed by corresponding projection units of the multi-display unit 52.

Figure 6:
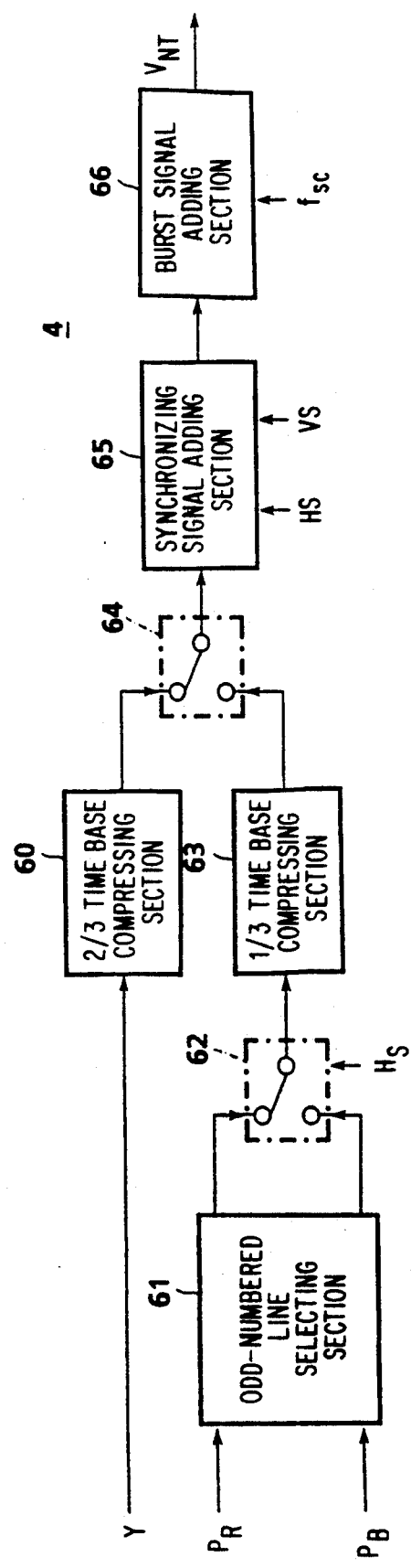
FIG. 6 is a block diagram showing a modified TCI encoder for use with the video signal recording apparatus of FIG. 1.

Referring now to FIG. 6, there is shown a modification to the TCI encoder 4 shown in FIG. 3. The modified TCI encoder 4 is constituted such that two kinds of color-difference signals $P_R$ and $P_B$ are line sequentially multiplexed alternately for each line. In particular, the TCI encoder 4 includes a two thirds time base compressing section 60 for time base compressing a luminance signal Y into two thirds. An odd-numbered line selecting section 61 selects a signal of an odd-numbered line of the two kinds of color-difference signals $P_R$ and $P_B$. A change-over circuit 62 alternately selects a color-difference signal $P_R$ or $P_B$ selected by the selecting section 61 for each line in response to a horizontal synchronizing signal HS. And one third time base compressing section 63 time base compresses a selected color-difference signal $P_R$ or $P_B$ into one third. Another change-over circuit 64 changes over outputs of the time base compressing sections 60 and 63 to time division multiplex the outputs for each line. A synchronizing signal adding section 65 adds horizontal and vertical synchronizing signals HS and VS of the NTSC system to a time division multiplexed signal received from the change-over circuit 64. A burst signal adding section 66 adds a color burst signal fsc of the NTSC system to a signal received from the synchronizing signal adding section 65 and outputs the resultant signal as a video signal $V_{NT}$ of the NTSC system.

With the TCI encoder of the present construction, a luminance signal Y is time base compressed to two thirds by the time base compressing section 60 while a color-difference signal $P_R$ or $P_B$ is time base compressed to one third by the time base compressing section 63. Then the thus compressed signals are time division multiplexed by the change-over circuit 64.

Figure 7:
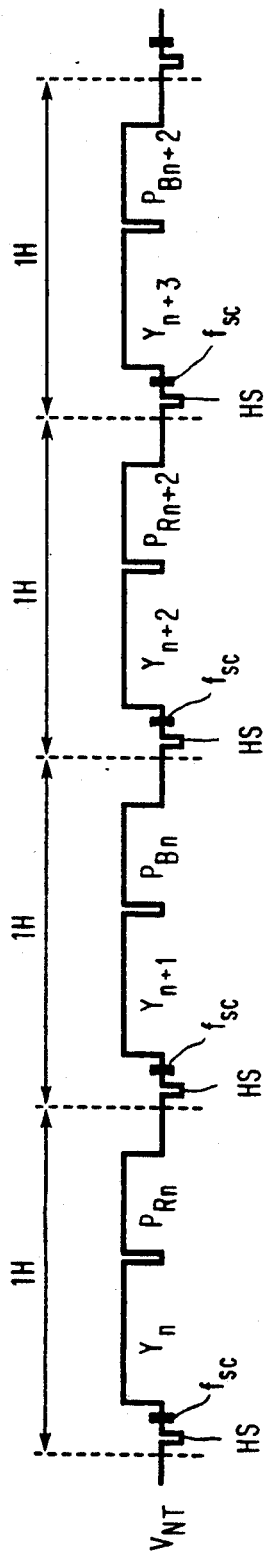
FIG. 7 is a view showing an output waveform of the TCI encoder shown in FIG. 6.
Figure 8B:
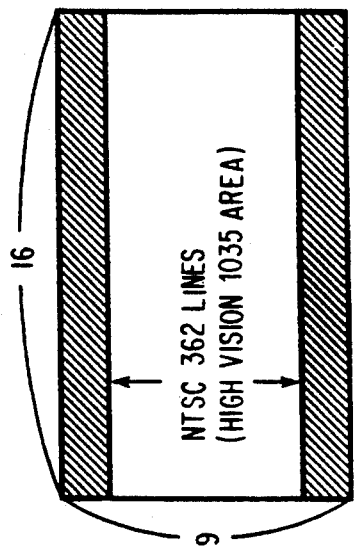
FIGS. 8a and 8b are diagrammatic representations illustrating output screens of a down converter.
Figure 8A:
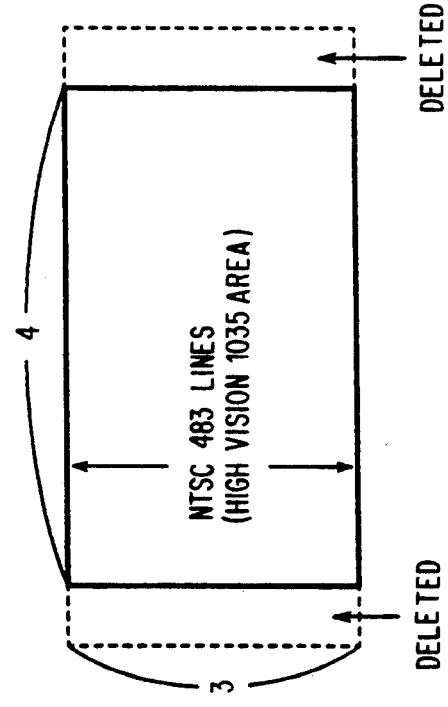
Figure 9B:
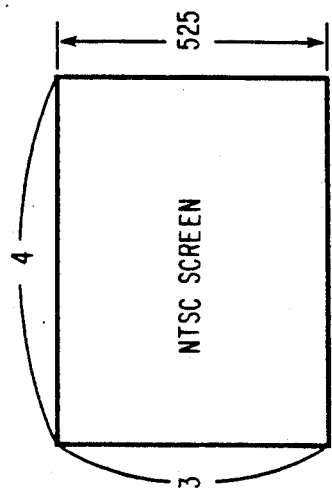
FIGS. 9a, 9b and 9c are diagrammatic representations illustrating construction of a screen according to a multi-display system.
Figure 9A:
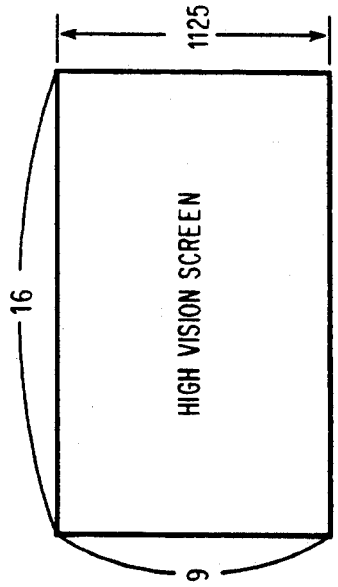
Figure 9C:
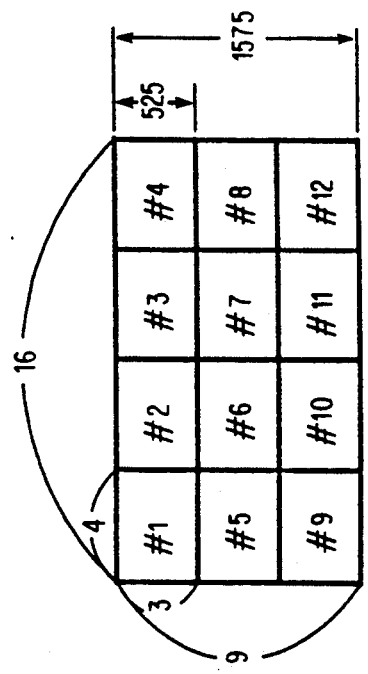

In this instance, only those of the color-difference signals $P_R$ and $P_B$ for odd-numbered lines are selected by the odd-numbered line selecting section 61. Then they are selected alternately for each line by the change-over circuit 62 and inputted to the time base compressing section 63. Consequently, in the output signal $V_{NT}$ of the TCI encoder 4, those of the two kinds of color-difference signals $P_R$ and $P_B$ for odd-numbered lines are arranged in a line sequential relationship as seen in FIG. 7.

In particular, color-difference signals for odd-numbered lines are multiplexed in a line sequential relationship such that signals $Y_1$ and $P_{R1}$ are multiplexed for the first line; signals $Y_2$ and $P_{B1}$ are multiplexed for the second line; signals $Y_3$ and $P_{R3}$ are multiplexed for the third line; signals $Y_4$ and $P_{B3}$ are multiplexed for the fourth line; and so forth. Further, a color burst signal fsc is added to a signal for each line.

Each of the signals which are line sequentially multiplexed in this manner is subsequently separated into a luminance signal and two color-difference signals and then expanded by such a reproducing apparatus as shown in FIG. 5. In this instance, however, color-difference signals for each even-numbered line are interpolated by the following calculating processing in the TCI decoder 51.

$$P_{R2n} = \frac{P_{R2n-1} + P_{R2n+1}}{2}$$

$$P_{B2n} = \frac{P_{B2n-1} + P_{B2n+1}}{2}$$

It is to be noted that, while each of the TCI encoders shown in FIGS. 3 and 6 includes the burst signal adding section 45 or 66, they need not necessarily include such burst signal adding section. In particular, such burst signal adding section 45 or 66 is provided to add such a color burst signal fsc as seen in FIG. 4 or 7 to a video signal for each line in order to enable video signals recorded by the video signal recording apparatus to be reproduced using a reproducing apparatus of a current television system. Accordingly, where there is no such particular intention, the burst signal adding sections 45 and 66 may be omitted from the TCI encoders shown in FIGS. 3 and 6, respectively.

It is also to be noted that, while in the embodiment described above the description proceeds taking the high vision system and the NTSC system as examples of a high definition television system and a current television system, respectively, naturally the present invention is not limited to this and can be applied to conversion between some other systems.

Further, while in the embodiment described above divided video signals are recorded on video disks, such signals may be recorded on some other record medium.

Having now fully described the invention, it will be apparent to one of ordinary skill in the art that many changes and modifications can be made thereto without departing from the spirit and scope of the invention as set forth herein.

What is claimed is:

1. A video signal recording method, comprising the steps of:
    dividing a video signal representative of a screen for a high definition television system into a plurality of video signals representative of a plurality of screens,
    converting said plurality of video signals into a plurality of converted signals representative of a current television system by changing an aspect ratio of said video signals,
    time division multiplexing a luminance signal and chrominance signals in each of the converted signals to produce a multiplexed signal, and
    recording said multiplexed signals onto a plurality of record media.

2. A video signal recording method, comprising the steps of:
    dividing a video signal representative of a screen for a high definition television system into a plurality of video signals representative of a plurality of screens,
    converting said plurality of video signals into a plurality of converted signals representative of a current television system by changing an aspect ratio of said video signals,
    time division multiplexing, for each line, two chrominance signals and a luminance signal corresponding to each line in each converted signal, and recording signals obtained by such time division multiplexing onto a plurality of record media.

3. A video signal recording method as claimed in claim 2, said method further comprising the steps of:
    time base compressing the luminance signal to one half, and
    time base compressing each of the two chrominance signals to one fourth, prior to time division multiplexing said luminance and chrominance signals.

4. A video signal recording method, comprising the steps of:
    dividing a video signal representative of a screen for a high definition television system into a plurality of video signals representative of an equal plurality of screens,
    converting said plurality of video signals into a plurality of converted signals representative of a current television system, each of said converted signals including a luminance signal and two chrominance signals,
    time division multiplexing, for each line, the luminance signal and one of said two chrominance signals, and
    recording signals obtained by said time division multiplexing onto a plurality of record media.

5. A video signal recording method as claimed in claim 4, said method further comprising the steps of:
    time base compressing the luminance signal to two thirds, and time base compressing one of the two chrominance signals to one third, prior to time division multiplexing said luiminance and chrominance signals.

6. A video signal recording method, comprising the steps of:
dividing a video signal representative of a screen for a high definition television system into a plurality of video signals representative of a plurality of screens,
converting said plurality of video signals into a plurality of converted signals representative of a current television system, each of said converted signals including a luminance signal and multiple chrominance signals,
time division multiplexing the luminance signal and chrominance signals from said converted signals,
adding a color burst signal to each line of each converted signal, and recording signals obtained from said addition onto a plurality of record media.

7. A video signal recording method, comprising the steps of:
dividing a video signal representative of a screen for a high definition television system into a plurality of video signals representative of an equal plurality of screens,
converting said plurality of video signals into a plurality of converted signals representative of a current television system by changing an aspect ratio of said video signals,
time division multiplexing, for each line, two chrominance signals and a luminance signal in each converted signal, and
adding a color burst signal for each line to signals obtained from said time division multiplexing, and recording signals obtained from said addition onto a plurality of record media.

8. A video signal recording method as claimed in claim 7, said method further comprising the steps of:
time base compressing the luminance signal to one half, and
time base compressing each of the two chrominance signals to one fourth, prior to time division multiplexing said luminance and chrominance signals.

9. A video signal recording method, comprising the steps of:
dividing a video signal representative of a screen for a high definition television system into a plurality of video signals representative of an equal plurality of screens,
converting said plurality of video signals into a plurality of converted signals representative of a current television system, each of said converted signals including a luminance signal and multiple chrominance signals,
time division multiplexing, for each line, the luminance signal and one of said multiple chrominance signals,
adding a color burst signal to each line of each multiplexed signal obtained from the time division multiplexing, and
recording signals obtained from said addition onto a plurality of record media.

10. A video signal recording method as claimed in claim 9, said method further comprising the steps of:
time base compressing the luminance signal to two thirds, and
time base compressing one of the multiple chrominance signals to one third, prior to time division multiplexing said luminance and chrominance signals.

11. A video signal recording apparatus, comprising:
means for dividing a video signal representative of a screen to be displayed in a high definition television system into a plurality of video signals representative of an equal plurality of screens,
means for converting each of said plurality of video signals into video signals representative of a current television system,
means for time division multiplexing a luminance signal and chrominance signals from each of the converted signals,
means for adding a color burst signal to each line of each multiplexed signal produced by the time division multiplexing means, and
means for recording signals from the adding means onto a plurality of record media.

12. A video signal recording apparatus, comprising:
means for dividing a video signal representative of a screen to be displayed in a high definition television system into a plurality of video signals representative of a plurality of screens,
means for converting each of said plurality of video signals into video signals representative of a current television system by changing an aspect ratio of said video signals,
means for time division multiplexing a luminance signal and chrominance signals from each of the converted signals, and
means for recording signals from the time division multiplexing means onto a plurality of record media.

13. A video signal recording apparatus as claimed in claim 11, wherein said dividing and converting means comprises:
a vertical dividing section for dividing said video signal representative of a screen into three sections in a vertical direction and for storing said three sections in three field memories,
a scanning line converter for converting horizontal scanning line data in each of the three field memories, and
a horizontal dividing section for dividing each of the converted horizontal scanning line data into four data segments, thereby producing said plurality of converted video signals.

14. A video signal recording apparatus as claimed in claim 12, wherein said dividing and converting means comprises:
a vertical dividing section for dividing said video signal representative of a screen into three sections in a vertical direction and for storing said three sections in three field memories,
a scanning line converter for converting horizontal scanning line data in each of the three field memories, and
a horizontal dividing section for dividing each of the converted horizontal scanning line data into four data segments, thereby producing said plurality of converted video signals.

15. A video signal recording apparatus as claimed in claim 11, wherein said time division multiplexing means further comprises:
a first change-over circuit for alternately selecting each of two chrominance signals for corresponding alternate lines of said converted signals, and a second change-over circuit for alternating between a chrominance signal selected by said first change-over circuit and said luminance signal.

16. A video signal recording apparatus as claimed in claim 12, wherein said time division multiplexing means further comprises:

a first change-over circuit for alternately selecting each of two chrominance signals for corresponding alternate lines of said converted signals, and a second change-over circuit for alternating between a chrominance signal selected by said first change-over circuit and said luminance signal.

17. A video signal recording method as claimed in claim 4, wherein said time division multiplexing step further comprises the steps of:

alternately selecting each of said two chrominance signals for corresponding alternate lines of said converted signals, and alternately selecting the chosen one of said chrominance signals selected in said first selection step and said luminance signal.

18. A video signal recording method as claimed in claim 9, wherein said time division multiplexing step further comprises the steps of:

alternately selecting each of said multiple chrominance signals for corresponding lines of said converted signals, and alternately selecting the chosen one of said chrominance signals selected in said first selection step and said luminance signal.

* * * * *